US012305422B2

(12) United States Patent
Wallace

(10) Patent No.: US 12,305,422 B2
(45) Date of Patent: May 20, 2025

(54) LOCK WITH TAMPER-EVIDENT SECURITY

(71) Applicant: NCR Atleos Corporation, Atlanta, GA (US)

(72) Inventor: David William Wallace, Cleish (GB)

(73) Assignee: NCR Atleos Corporation, Atlanta, GA (US)

( * ) Notice: Subject to any disclaimer, the term of this patent is extended or adjusted under 35 U.S.C. 154(b) by 28 days.

(21) Appl. No.: 18/129,462

(22) Filed: Mar. 31, 2023

(65) Prior Publication Data

US 2024/0328198 A1 Oct. 3, 2024

(51) Int. Cl.

| | |
|---|---|
| ***E05B 39/04*** | (2006.01) |
| ***E05B 45/06*** | (2006.01) |
| ***E05B 65/00*** | (2006.01) |

(52) U.S. Cl.

CPC .............. *E05B 39/04* (2013.01); *E05B 45/06* (2013.01); *E05B 65/0075* (2013.01); *E05B 2045/064* (2013.01)

(58) Field of Classification Search

CPC .. E05B 45/06; E05B 17/2084; E05B 19/0005; E05B 9/02; G07C 9/0091

See application file for complete search history.

(56) References Cited

U.S. PATENT DOCUMENTS

2015/0240531 A1* 8/2015 Blust .................. G07C 9/00571 340/5.5
2017/0044800 A9* 2/2017 Lowder .............. G07C 9/00658
2019/0180533 A1* 6/2019 Gilbertson ......... G07C 9/00563
2021/0025205 A1* 1/2021 Taylor ................... E05C 19/003
2024/0203189 A1* 6/2024 Mande ................... G07D 11/40

FOREIGN PATENT DOCUMENTS

CN 110939327 3/2020
IT UB20159755 6/2017
WO 2012050936 4/2012

* cited by examiner

*Primary Examiner* — Mirza F Alam

(74) *Attorney, Agent, or Firm* — Schwegman Lundberg & Woessner, P.A.

(57) ABSTRACT

A safe with lock tampering capabilities is provided. A lock apparatus includes a lock body, a lock backplate, a lock, and a sensor. The sensor raises an event when a first end and/or a send end of the sensor loses contact with a surface of the lock body and/or a surface of the lock backplate. The event is reported by the safe as a lock tampering event. Whenever the safe loses power and is subsequently restored power, the safe reports a lock tampering event.

8 Claims, 4 Drawing Sheets

LOCK WITH TAMPER-EVIDENT SECURITY

BACKGROUND

Locks have a variety of uses, one of which in connection with media terminals because the terminals accept and dispense currency notes to consumers. A plethora of technology exists in the industry to detect, lock, unlock, and report access to safes associated with media terminals. The safes include cassettes which store the notes.

Media terminals frequently need replenished with notes when denomination of the notes are low or when a denomination in a cassette is at its note capacity. Authorized personnel are dispatch with the proper authorization to access the safes and a variety of additional security precautions are enforced.

However, not all personnel are trustworthy, and some have taken advantage of their authorized access to tamper with the safe lock making it easy for them or someone they know to return to the terminal during an unauthorized visit, open the safe and cassettes, and remove the notes. The manner in which these individual tamper with the lock prevents security detection by existing technology available in the industry.

SUMMARY

In various embodiments, a lock apparatus, a safe with the lock apparatus, and a method for detecting lock tampering are presented The lock apparatus includes a lock body, a lock backplate, a lock, and a sensor. The sensor is a contact sensor anchored on a surface of the lock body and extending to and touching a surface of the lock backplate such that when the lock backplate is removed from the lock body to gain access to the lock, the sensor sends a signal indicating the backplate was separated from the lock body. Should a host device that supplies power to a safe associated with the lock apparatus lose power, a security agent of the safe will report an unauthorized access when power is restored.

DETAILED DESCRIPTION

Unfortunately, technicians and media service personnel/staff who are authorized to access a media terminal's safe are not always trustworthy. A few of these individuals have been known to tamper with the safe's lock in a manner that permits the safe to be unlocked upon a return and unauthorized visit to the terminal. Notably, the tampering requires an individual to remove the lock's backplate in order to access the lock. Typically, the backplate is removed during the visit or removed after cutting power off during the visit. In either case, removal of the backplate goes undetected and there is chance that the safe's lock was tampered with so that someone can return later to the terminal and unlock the safe without proper authorization.

The above-described security hole is remedied by the teachings provided herein. A lock apparatus is provided with a sensor. The sensor does not report any event when the backplate of the lock apparatus remains in contact with the lock body. Whenever the sensor loses contact with a surface of the backplate or a surface of the body, the sensor reports a lock tampering event. Firmware or software on a safe associated with the lock apparatus also reports a lock tampering event anytime the safe loses power as soon as power is restored. This ensures that power cannot be cut to the safe, the backplate removed, the backplate reattached to the lock body, and power restored to the safe without a lock tampering event being reported. The firmware or software of the safe reports the lock tampering events to a security agent of the media terminal and the security agent can activate security actions and procedures in response thereto. Alternatively or additionally, the security agent of the media terminal reports the lock tampering events to a security system of a cloud or a server. The security system can activate security actions and procedures in response thereto.

Figure 1A:
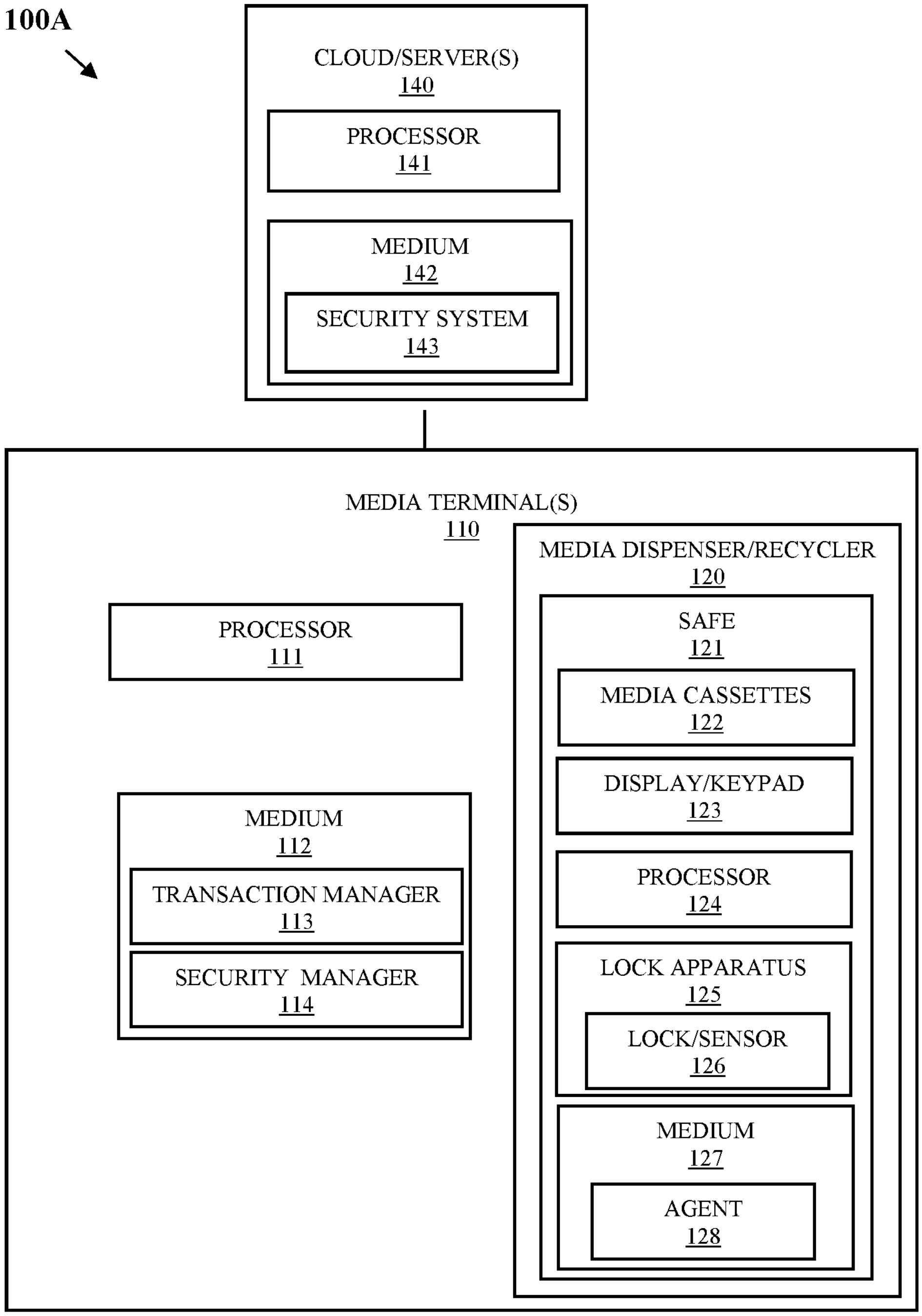
FIG. 1A is a diagram of a system for detecting tampering with a lock apparatus, according to an example embodiment.

FIG. 1A is a diagram of a system 100A for detecting tampering with a lock apparatus, according to an embodiment. It is to be noted that the components are shown schematically in greatly simplified form, with only those components relevant to understanding of the embodiments being illustrated.

Furthermore, the various components (that are identified in FIG. 1A) are illustrated and the arrangement of the components is presented for purposes of illustration only. It is noted that other arrangements with more or less components are possible without departing from the teachings of detecting tampering with a lock apparatus presented herein and below.

System 100A includes one or more media terminals (hereinafter "terminals") 110 and optionally a cloud 140 or a server 140 (hereinafter just "cloud 140'). Each terminal 110 includes a processor 111, a non-transitory computer-readable storage medium (hereinafter just "medium") 112, which includes executable instructions for a transaction manager 113 and a security manager 114. The instructions when executed by processor 111 from memory 112 cause the processor 111 to perform the operations discussed herein and below for 113-114. Each terminal 110 also includes a media dispenser/recycler 120.

Media dispenser/recycler 120 includes a safe 121. The safe 121 includes media cassettes 122, a display/keypad 123, a processor, a lock apparatus 125, and a non-transitory computer-readable storage medium 127, which includes executable instruction for a security agent 128. When processor 124 executes the instructions from medium 127, this causes the processor to perform operations discussed herein and below with respect to 128.

Figure 1B:
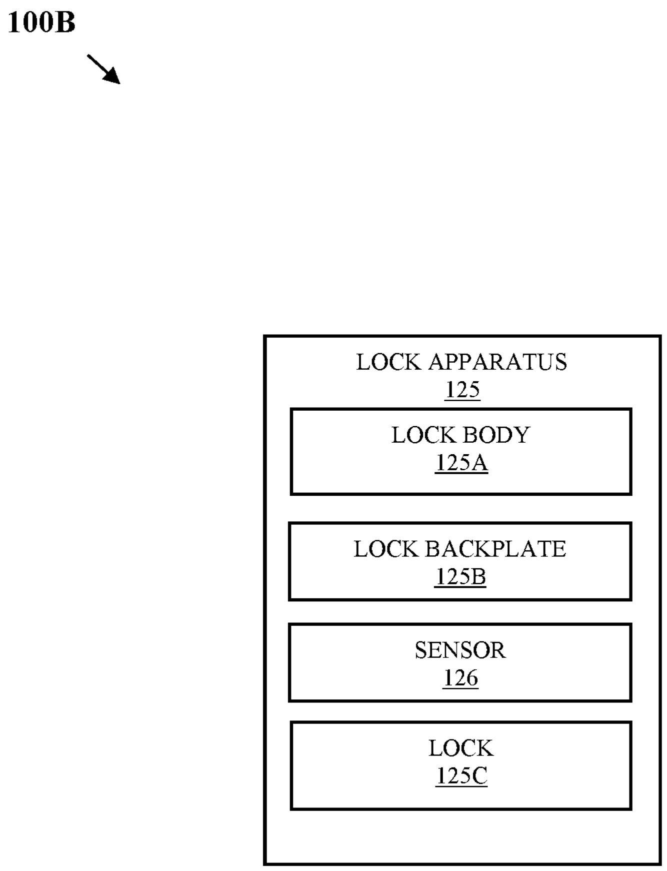
FIG. 1B is a diagram of a lock apparatus, according to an example embodiment.

Lock apparatus 126 includes a lock/sensor 126. FIG. 1B is a more detailed diagram of lock apparatus 126, according to an example embodiment. Lock apparatus 126 includes a lock body 125A, a lock backplate 125B, a sensor 126, and a lock 125C.

Figure 1C:
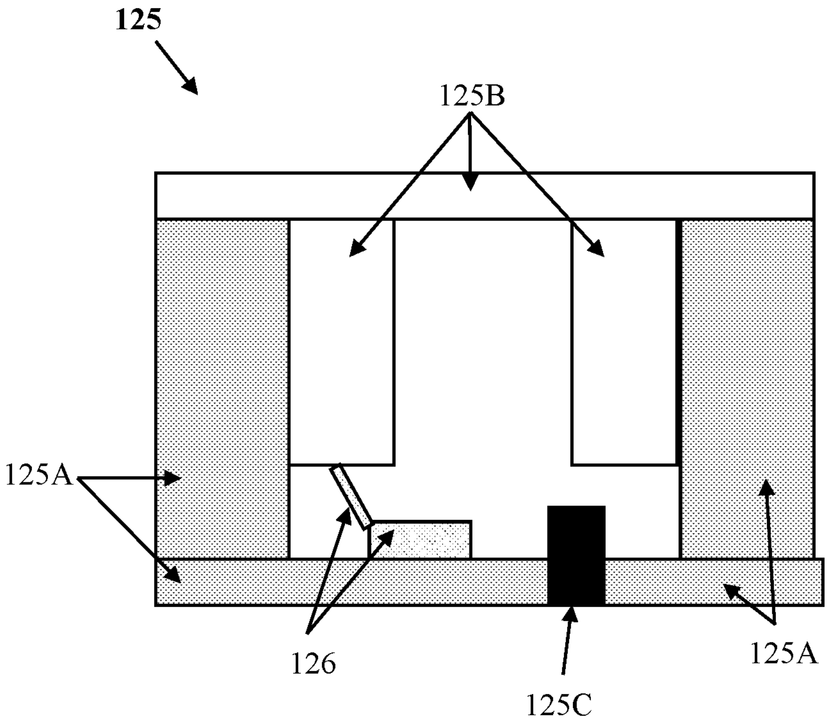
FIG. 1C is another diagram of the lock apparatus, according to an example embodiment.

FIG. 1C is a diagram illustrating the relationship and position of the lock components 125A, 125B, 126, and 125C relative to one another, according to an example embodiment. The lock backplate 125B interlocks with lock body 125A with lock 125C extending into an interior space of the lock apparatus 125 when the lock 125C is in an unlocked or unlock state. When the lock 125C is in a locked or unlock state, lock 125C extends out from lock body 125A into an aperture in a side wall of the safe 121. Because lock body 125A and lock backplate 125B are interlocked with one another the two 125A and 125B cannot be separated without detection by sensor 126. Thus, there is no mechanism by which lock 125C can be tampered with without being detected.

Sensor 126 is anchored on an inside surface of lock body 125A proximate to lock 125C. Furthermore, sensor 126 includes a first end anchored to lock body extending to a second end that makes surface contact with of lock backplate 125B. Sensor 126 is surface contact sensor that reports when touch contact is broken between either of the two surfaces (e.g., a surface of the lock backplate 125B or a surface of lock body 125A). This ensures that whenever the backplate 125B is removed and separated from lock body 125A and event is raised by sensor 126.

Events raised by sensor 126 are recorded, logged, and reported by agent 128 of safe 121. In an embodiment, agent 128 reports the events to security manager 114 and/or security system 143 when safe 121 has its own independent network connection to cloud 140. When safe 121 lacks an independent network connection to cloud 140, the events reported to security manager 114 are reported over the terminal's network connection to security system 143.

Agent 128, manager 114, and/or system 143 maintain an audit log each time the safe 120 is accessed since notes in cassettes 122 are exposed to potential theft. Agent 128, manager 114, and/or system 143 also process security workflows in response to lock tampering events. The workflows can be similar or different from one another.

Agent 128 also raises a lock tampering event when power is cut to the safe 121 and/or terminal 110 and then subsequently restored. That, agent 128 undergoes a reboot and loading into memory each time power is restored, thus agent 128 knows when it is being loaded and starting up. On start up, agent 128 sends a lock tampering event to security manager 114 and/or security system 143.

It may be that the power loss was known and expected such that the security event can be cleared by the appropriate personnel and security actions are unnecessary. It may also be that a known reboot, a patch, an update, or an upgrade was performed on agent 128 or some other software component of safe 121; in such cases the lock tampering event can also be cleared by the personnel. In an embodiment, agent 128 is configured to be provided a code from manager 114 and/or 143 that overrides reporting of the lock tampering event. The code can be provided before the reboot or power loss, such that agent 128 configures itself to clear the lock tampering event during its reboot and load based on a flag set in storage which is read by agent 128 on startup. The code can also be provided after startup or reboot by manager 114 and/or system 143 after agent 128 starts up and initially reports the lock tampering event.

Thus, backplate 125B cannot be separated from lock body 125A during a loss of power because on reboot when power is restored, agent 128 will raise a lock tampering event to manager 114 and/or system 143 unless a prior authorization code was provided before the loss of power to safe 121. Agent 128 can continue to report the lock tampering event once detected until an authorization code is received from manager 114 and/or system 143. Unexpected and unplanned reboots or power loses that explainable can quickly stop agent 128 from reporting the lock tampering event through an authorization code provided as an override by manager 114 and/or system 143.

When power is not lost, the backplate 125B cannot be separated from lock body 125A without agent 128 reporting a lock tampering event to manager 114 and/or system 143. The lock 125C cannot be accessed internally from lock apparatus 125 without removing the backplate 125B from lock body 125A. Thus, any authorized individual on a service visit to safe 121 cannot tamper with lock 125 without being detected and without security actions and protocols being instituted.

This plugs a security hole present in the industry and prevents authorized personnel with access to safe 121 from tampering with lock 125 without being detected. This is because security logs are maintained by agent 128, manager 114, and/or 143 which record details with dates, times of day, personnel identifiers, and service action identifiers for service activities of each authorized service activity. Thus, the lock tampering event is raised by agent 128 either during the service visit or shortly after the service visit when power was cut during the service visit and restored after the service event. The last personnel to access the safe 121 before the lock tampering event was raised will be known.

In an embodiment, lock 125 is an e-lock, which has an independent network connection to security system 143 from terminal 110. Authorized individuals are authenticated via their mobile devices and provided an authorization code to access the safe 121 by system 143. Additional cryptographic algorithms are executed by processor 121 to independently generate the code and compare the code entered on display 123 or keypad 123 by the authorized individual against the independently generated code.

In an embodiment, terminal 110 is an automated teller machine, a self-service terminal, or a point-of-sale terminal. In an embodiment, agent 128 is subsumed and processed by security manager 114. In an embodiment, lock apparatus 125 is associated with a different device or a different server from 110 and 140. In an embodiment, lock apparatus 125 is any smart lock affixed to any structure or interfaced to a processing device. In this latter embodiment, lock apparatus 125 includes a processor and a medium with instructions 128 that are executed by the lock apparatus processor.

Figure 2:
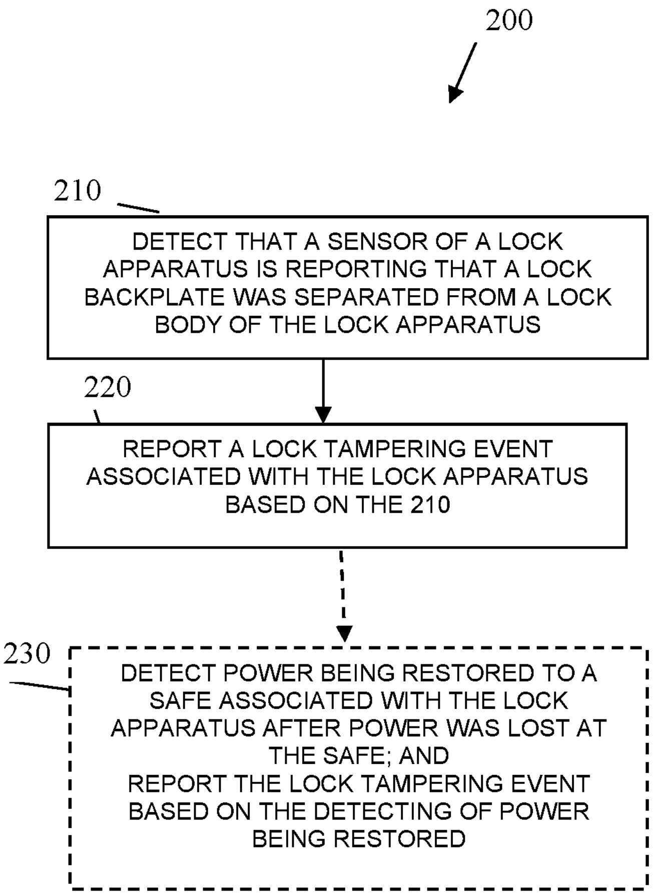
FIG. 2 is a flow diagram of a method for detecting tampering with the lock apparatus, according to an example embodiment.

The above-referenced embodiments and other embodiments will now be discussed with reference to FIG. 2. FIGS. is a flow diagram of a method 200 for detecting tampering with the lock apparatus, according to an example embodiment. The software module(s) that implements the method 200 is referred to as a "safe lock tamper manager." The safe lock tamper manager is implemented as executable instructions programmed and residing within memory and/or a non-transitory computer-readable (processor-readable) storage medium and executed by one or more processors of one or more devices. The processor(s) of the device(s) that executes the safe lock tamper manager are specifically configured and programmed to process safe lock tamper manager. The safe lock tamper manager may have access to one or more network connections during its processing. Any connections can be wired, wireless, or a combination thereof.

In an embodiment, the device that executes the safe lock tamper manager is safe 121. In an embodiment, the safe lock tamper manager is agent 128.

At 210, the safe lock tamper manager detects that a sensor 126 of a lock apparatus 125 is reporting that a lock backplate 125B was separated from a lock body 125A of the lock apparatus 125. This is an indication that the lock 125C of the lock apparatus 125 has potentially been tampered with during an authorized opening of a safe 121 of a media terminal 110.

At 220, the safe lock tamper manager reports a lock tampering event associated with the lock apparatus 125 based on 210. The safe lock tamper manager reports the lock tampering event to one or more of security manager 114 and security system 143.

In an embodiment, at 230, the safe lock tamper manager detects power being restored to the safe 121 associated with lock apparatus 125 after power had been lost at the safe 121. In response to detecting a restoration of power, the safe lock tamper manager reports the lock tampering event to one or more of security manager 114 and security system 143.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A safe, comprising:

a housing comprising media cassettes that store currency notes;

an access door on the housing to provide authorized access to the media cassettes;

a display or keypad affixed to an external surface of the access door, a lock apparatus comprising a lock backplate, a lock body, a sensor, and a lock integrated into the access door and the lock body, wherein a portion of the lock body is secure attached to an inside surface of the access door;

a processor;

a non-transitory computer-readable storage medium comprising executable instructions;

the executable instructions when executed by the processor cause the processor to perform operations comprising:

detecting a lock tampering event raised by the sensor when a surface of the lock backplate is no longer in contact with the sensor indicating that the lock backplate was removed from the lock body; and reporting the lock tampering event when the safe is restored power after having lost power;

wherein the sensor is anchored on an inside surface of the lock body proximate to the lock and includes a first end anchored to the lock body extending to a second end that makes surface contact with the lock backplate.

2. The safe of claim 1, wherein the executable instructions when executed by the processor further cause the processor to perform additional operations comprising:

resetting the lock tampering event based on an authorization code received from a terminal or server after the power is restored and the lock tampering event was reported to one or more of the terminal and the server.

3. The safe of claim 1, wherein the safe is integrated into a media recycler or dispenser.

4. The safe of claim 3, wherein the media recycler or dispenser is a peripheral device of a media terminal.

5. The safe of claim 4, wherein the media terminal is an automated teller machine, a self-service terminal, or a point-of-sale terminal.

6. The safe of claim 1, wherein the sensor is a contact sensor that makes contact with a surface of the lock body and a surface of the lock backplate when the lock body is interlocked with the lock backplate on the inside surface of the safe door.

7. The safe of claim 1 further comprising:

an external network connection to a server; and an internal network connection to a media recycler or dispenser;

wherein the safe is a peripheral device of the media recycler or dispenser, and wherein the media recycler or dispenser is a peripheral device of a media terminal.

8. The safe of claim 7, wherein the executable instructions when executed by the processor further cause the processor to perform additional operations comprising:

receiving an access authorization code via the display or the keypad;

authenticating the access authorization code with the server over the external network connection and receiving access details for the access authorization code from one or more of the server and the media terminal;

controlling the lock apparatus to unlock the lock and open the safe door when the server authenticates the access authorization code; and logging or reporting the access details.

* * * * *